(No Model.)
A. GARNER.
DEVICE FOR HACKING TREES IN GATHERING TURPENTINE.
No. 273,061. Patented Feb. 27, 1883.
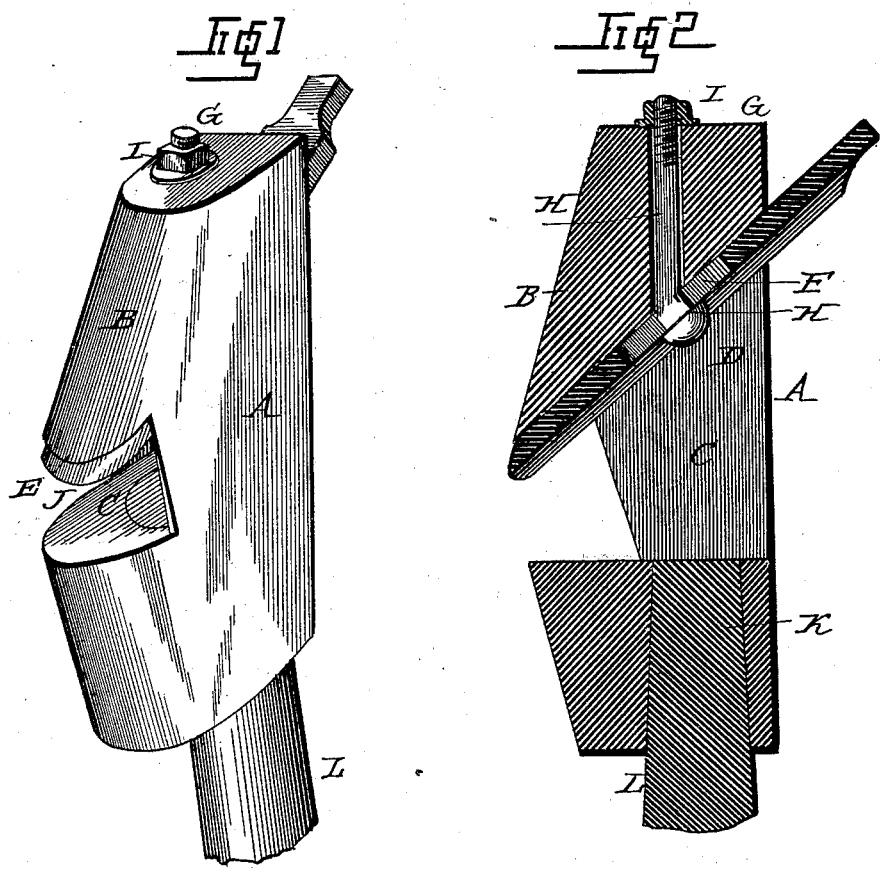
WITNESSES:
Fred. G. Dieterich
J. G. Hinkel
Allen Garner
INVENTOR.
By Louis Bagger & Co
ATTORNEYS

UNITED STATES PATENT OFFICE.

ALLEN GARNER, OF MOBILE, ALABAMA.

DEVICE FOR HACKING TREES IN GATHERING TURPENTINE.

SPECIFICATION forming part of Letters Patent No. 273,061, dated February 27, 1883.

Application filed January 8, 1883. (No model.)

*To all whom it may concern:*

Be it known that I, ALLEN GARNER, of Mobile, in the county of Mobile and State of Alabama, have invented certain new and useful Improvements in Devices for Hacking Trees in Gathering Turpentine; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my device for hacking trees in gathering turpentine; and Fig. 2 is a longitudinal section of the same.

Similar letters of reference indicate corresponding parts in both the figures.

My invention has relation to devices for hacking trees in gathering turpentine; and it consists in the improved construction and combination of parts of the same, as hereinafter more fully described and claimed.

For hacking trees—*i. e.*, cutting the bark of trees to cause the turpentine to flow—a tool is generally used somewhat of the shape of a heavy curved band-knife, mounted upon a short handle, which is operated by a striking motion, and cuts a great deal more bark away than is necessary to cause the crude turpentine to flow, and at the same time requires hard labor and a certain skill in operating it. This process is wasteful, in cutting too high up on the tree, so that the tree is unfit for tapping in a comparatively short time, and a large space is left open, upon which the so-called "scrape" collects, which yields a less quantity of turpentine, and requires too long time and too much labor.

To avoid these evils I construct a tool as shown in the accompanying drawings, in which the letter A represents the frame, having a rounded bulging side, B, in which is a slot, C. This slot C is carried through the frame, and widens into a recess, D, upon the upper side of which is fastened a cutter, E, the whole being constructed somewhat like a plane. This cutter is rounded, and has a longitudinal slot, F, by which it slides adjustably upon a screw-bolt, G, having a head, H, and passing through the upper part of the stock or frame, where it is fastened by means of a nut, I. The lower end of the cutter projects out through slot C, and is ground beveled from the outside, forming a rounded edge, J. The lower end of the stock has a longitudinal recess, K, for the reception of a handle, L, which may be of any desired length, and by which the tool is operated.

The device is drawn in the same manner as a plane, and will just remove sufficient bark to cause the turpentine to flow, and by using a longer handle, as in the course of time it is necessary to hack higher up on the tree, the hacking can be performed at any reasonable height, while with the generally-used tool trees can only be hacked to about a man's height.

Having thus described my invention, I claim and desire to secure by Letters Patent of the United States—

The herein-described tool for hacking trees in gathering turpentine, consisting in the stock A, having recess K, adapted to receive a handle, L, slot C, opening into recess D, and cutter E, having lower rounded and beveled edge J, and slot F, and adjustably fastened by means of bolt G, having head H and nut I, the whole constructed and combined substantially as and for the purpose shown and described.

In testimony that I claim the foregoing as my own I have hereunto affixed my signature in presence of two witnesses.

ALLEN GARNER.

Witnesses:
EDWIN TARDY,
D. J. MURRAY.